United States Patent [19]
Lustig et al.

[11] Patent Number: 5,433,651
[45] Date of Patent: Jul. 18, 1995

[54] IN-SITU ENDPOINT DETECTION AND PROCESS MONITORING METHOD AND APPARATUS FOR CHEMICAL-MECHANICAL POLISHING

[75] Inventors: Naftali E. Lustig, Croton-on-Hudson; Katherine L. Saenger, Ossining; Ho-Ming Tong, Yorktown Heights, all of N.Y.

[73] Assignee: International Business Machines Croporation, Armonk, N.Y.

[21] Appl. No.: 173,294

[22] Filed: Dec. 22, 1993

[51] Int. Cl.⁶ .............................................. B24B 49/00
[52] U.S. Cl. .................................... 451/6; 156/636.1; 216/88
[58] Field of Search ................... 451/6, 7; 437/7, 225; 156/626, 636

[56] References Cited

U.S. PATENT DOCUMENTS

| | | | |
|---|---|---|---|
| 4,272,914 | 6/1981 | Masuko et al. | 51/165 |
| 4,328,068 | 5/1982 | Curtis | 156/626 |
| 4,512,847 | 4/1985 | Brunsch et al. | 156/626 |
| 4,793,895 | 12/1988 | Kaanta et al. | 156/627 |
| 4,948,259 | 8/1990 | Eake et al. | 356/382 |
| 4,954,142 | 9/1990 | Carr et al. | |
| 5,081,421 | 1/1992 | Miller et al. | 324/671 |
| 5,081,796 | 1/1992 | Schultz | 514/165 |
| 5,084,071 | 1/1992 | Nenadic et al. | |
| 5,132,617 | 7/1992 | Leach et al. | 324/207.16 |
| 5,213,655 | 5/1993 | Leach et al. | 156/627 |
| 5,234,868 | 8/1993 | Cote | 156/636 |
| 5,242,524 | 9/1993 | Leach et al. | 156/345 |
| 5,337,015 | 8/1994 | Lustig et al. | 324/671 |
| 5,395,801 | 3/1995 | Doan et al. | 156/636 |

FOREIGN PATENT DOCUMENTS

| | | | |
|---|---|---|---|
| 0625573 | 8/1961 | Canada | 437/7 |
| 0468897 | 1/1992 | European Pat. Off. | 156/626 |
| 57-138575 | 8/1982 | Japan | B24B 37/04 |
| 0074635 | 4/1984 | Japan | 156/626 |

OTHER PUBLICATIONS

Research Disclosure, Aug. 1992, No. 340, Kenneth Mason Publications, Ltd., England, Disclosed Anonymously, "End-Point Detection Oxide Polishing And Planarization Of Semiconductor Devices".

Primary Examiner—Bruce M. Kisliuk
Assistant Examiner—Derris Banks
Attorney, Agent, or Firm—Michael J. Balconi-Lamica; Alison D. Mortinger

[57] ABSTRACT

An in-situ chemical-mechanical polishing process monitor apparatus for monitoring a polishing process during polishing of a workpiece in a polishing machine, the polishing machine having a rotatable polishing table provided with a polishing slurry, is disclosed. The apparatus comprises a window embedded within the polishing table, whereby the window traverses a viewing path during polishing and further enables in-situ viewing of a polishing surface of the workpiece from an underside of the polishing table during polishing as the window traverses a detection region along the viewing path. A reflectance measurement means is coupled to the window on the underside of the polishing table for measuring a reflectance, the reflectance measurement means providing a reflectance signal representative of an in-situ reflectance, wherein a prescribed change in the in-situ reflectance corresponds to a prescribed condition of the polishing process.

51 Claims, 5 Drawing Sheets

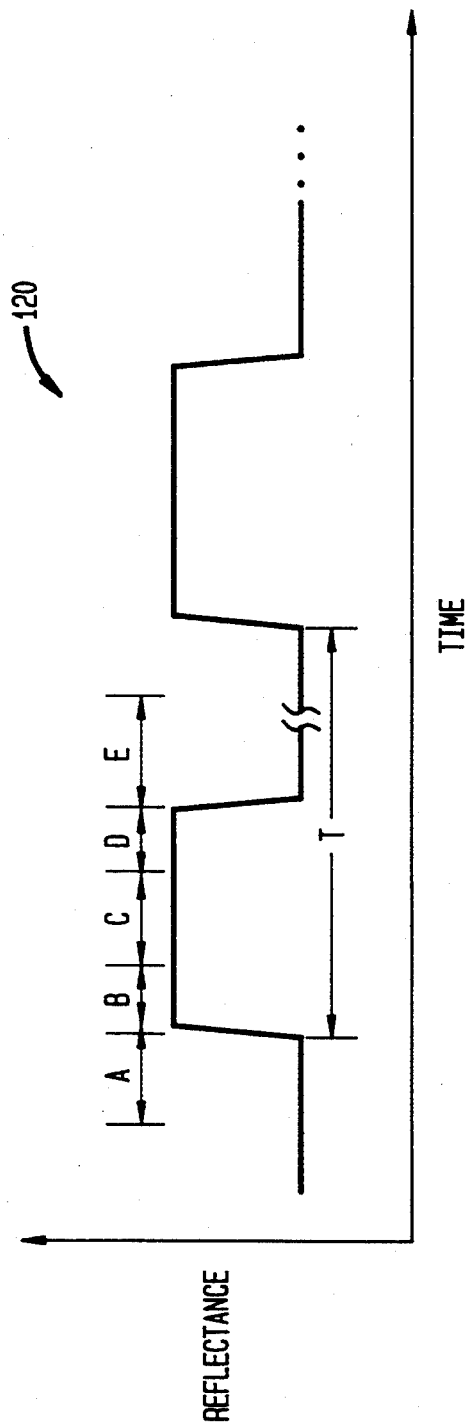
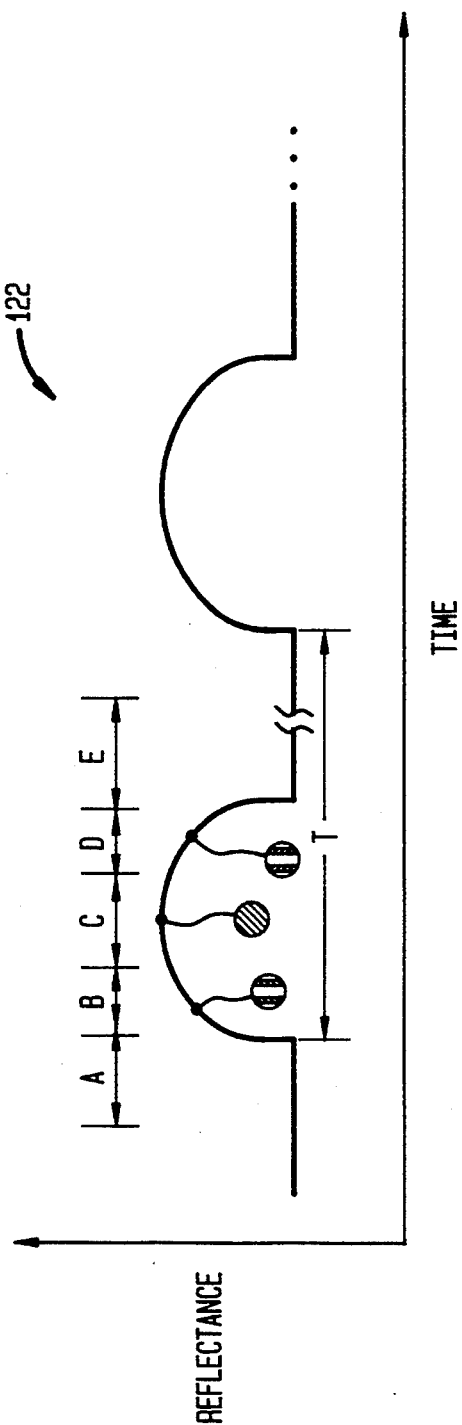

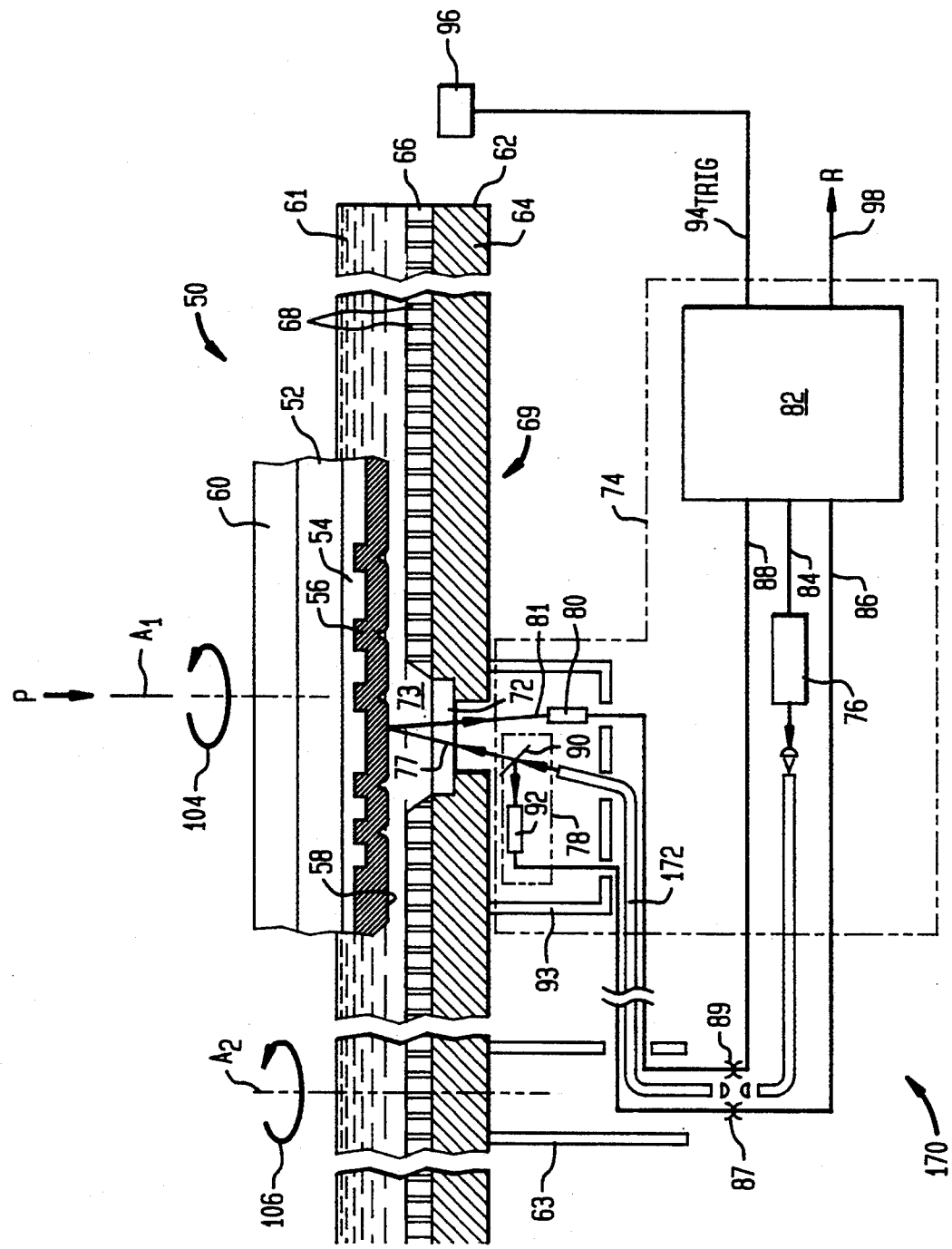

IN-SITU ENDPOINT DETECTION AND PROCESS MONITORING METHOD AND APPARATUS FOR CHEMICAL-MECHANICAL POLISHING

BACKGROUND OF THE INVENTION

1. Field of the Invention

This invention relates to a method and apparatus for use in determining a planarization endpoint during a chemical-mechanical polishing process of a semiconductor wafer.

2. Discussion of the Related Art

In VLSI wiring technology, connecting metal lines are formed over a substrate containing device circuitry. These metal lines serve to electrically interconnect the discrete devices. These metal connecting lines are further insulated from the next interconnection level by thin films of insulating material formed by, for example, chemical vapor deposition (CVD) of oxide. In order to interconnect metal lines of different interconnection levels, holes are formed in the insulating layers to provide electrical access therebetween. In such wiring processes, it is desirable that the layers have a smooth surface topography, because rough surfaces cause fabrication problems. More specifically, it is difficult to image and pattern layers applied to rough surfaces, and this difficulty increases as the number of layers increases.

Presently, there are various types of lapping machines for reducing the thickness of semiconductor wafers. In general, these lapping machines include top and bottom lapping plates, between which the wafers are positioned. The two lapping plates are then moved relative to each other, and a slurry, consisting of an abrasive solution with or without an etching reagent, is fed between the plates to grind and flush away ground wafer particles. While lapping is typically associated with bulk removal of material from a wafer surface, chemical-mechanical polishing (CMP) refers to polishing of thin films rather than bare wafers. In chemical-mechanical polishing, the slurry is fed between the lapping or polishing plates to remove and flush away unwanted film material. A chemical-mechanical polishing machine can include a single rotating polishing plate and a smaller diameter rotating wafer carrier (or carriers) to which a wafer (or wafers) is (are) mounted. The wafer carrier is held above the polishing plate, either in a stationary fixed position or oscillating back and forth in a predetermined path, while both polishing plate and wafer carrier are rotated about their respective center axes. A slurry, as described above, is fed onto the polishing plate during polishing of the wafer. In these processes, it is important to remove a sufficient amount of material to provide a smooth surface, without removing an excessive amount of underlying materials. Thus, a precise etch endpoint detection technique is needed.

Additionally, as metal and insulator polishing processes are becoming increasingly important in the fabrication of multilayer metal/insulator thin film structures, it is critically important to stop the polishing process upon the disappearance, i.e., removal, of the last unwanted monolayers of metal or insulator. In the fabrication of fine-line multilayer structures, i.e., structures having line features on the order of 1 $\mu$m or less, very high polishing selectivities, i.e., metal/insulator polishing rate ratios, are needed, however, such high polishing selectivities are not easily obtainable. As a consequence, endpoint detection is necessary and highly desirable to indicate when, for example, the last monolayers of the unwanted metal between the trenches has been removed. Excessive polishing may lead to the excessive thinning of metal lines within trenches, leading to creation of "wires" which are too thin for carrying a required current. On the other hand, insufficient polishing of a metal layer will produce electrical shorts between "wires" which should be isolated electrically. Accurate determination of the polishing process endpoint is thus critical for improved process quality and throughput.

FIG. 1 shows an example of the formation of interlevel metal contact vias 10 (FIG. 2) between a first level metalization 12 and a second level metalization (not shown) in a high performance VLSI circuit 14. Metal contact vias 10 may also represent interconnection wires for a particular metalization level. Following via formation (or wire pattern formation) in interlevel dielectric layer 16 by reactive ion etching, a metalization layer 18 is blanket deposited (FIG. 1). The metalization layer 18 is then polished back to produce planar metal studs 10 (or wires) shown in FIG. 2. A planarization of metalization layer 18 can be achieved upon polishing back using CMP. A persistent difficulty in this process is the inability to precisely determine when the endpoint has been reached during the planarization of the metalization layer 18.

One method and apparatus for CMP endpoint determination is shown in U.S. Pat. No. 5,081,796, issued Jan. 21, 1992 and assigned to Micron Technology, Incorporated. In the '796 patent, endpoint determination is based on an off-table interferometric measurement through a water jet, while the wafer is positioned to overhang the edge of the polishing table. A disadvantage of the '796 apparatus is that the monitored part of the wafer must be off the table during the time of the measurement, which requires a deviation from the wafer's normal trajectory. This deviation increases the likelihood of polishing non-uniformities. Another disadvantage is that the wafer area probed is likely to be much smaller than the area of the wafer that is moved off the table for the measurement, especially for probe sites at the wafer's center. This unduly lowers the duty cycle of the polisher, thereby reducing effective polishing rates and resulting in increased process costs. The '796 apparatus suffers from a dependence upon carrier and table speeds, and in addition, does not lend itself easily to continuous process monitoring, i.e., spatially selective measurements, such as, center to edge polishing variations.

In addition to the above-noted characteristics of CMP, removal uniformity can change during polishing of a wafer as a result of changes in pad and wafer carrier conditions. Detection of abnormal removal uniformity or spurious changes therein is therefore highly desirable, i.e., a method and apparatus for in-situ detection and monitoring of removal non-uniformity.

Thus, there remains a continuing need in the semiconductor fabrication art for an apparatus and method which accurately and efficiently detects and monitors polishing characteristics of a chemical-mechanical planarization process. An in-situ real-time method and apparatus is highly desired.

SUMMARY OF THE INVENTION

An object of the present invention is to provide a in-situ real-time CMP polishing process monitor/endpoint detection method and apparatus.

Another object of the present invention is to provide a method and apparatus for CMP polishing process monitoring/endpoint detection operable over a wide range of polishing table speeds.

Yet another object of the present invention is to provide a method and apparatus for in-situ removal non-uniformity detection.

According to the invention, an in-situ chemical-mechanical polishing process monitor apparatus for monitoring a polishing process during polishing of a workpiece in a polishing machine, the polishing machine having a rotatable polishing table provided with a polishing slurry, comprises a window embedded within the polishing table, whereby the window traverses a viewing path during polishing and further enables in-situ viewing of a polishing surface of the workpiece from an underside of the polishing table during polishing as the window traverses a detection region along the viewing path. A reflectance measurement means is coupled to the window on the underside of the polishing table for measuring a reflectance, where the reflectance measurement means provides a reflectance signal representative of an in-situ reflectance, wherein a prescribed change in the in-situ reflectance corresponds to a prescribed condition of the polishing process.

BRIEF DESCRIPTION OF THE DRAWINGS

The foregoing and other teachings of the present invention will become more apparent upon a detailed description of the best mode for carrying out the invention as rendered below. In the description to follow, reference will be made to the accompanying drawings, where like reference numerals are used to identify like parts in the various views and in which:

FIG. 6 shows a graph of in-situ reflectivity versus time in accordance with the present invention;

FIG. 7 shows a graph of in-situ reflectivity versus time in accordance with the present invention; and FIG. 8 shows a schematic view, with parts in section, of an alternate embodiment according to the present invention.

DETAILED DESCRIPTION OF THE PREFERRED EMBODIMENTS

The invention is disclosed in connection with a chem-mech polishing apparatus or lapping machine. Because chem-mech polishing apparatus and lapping machines are well known, this description is directed in particular to elements of chem-mech polishing apparatus forming part of or cooperating directly with the invention. It is to be understood, however, that other elements not specifically shown or described may take various forms known to persons of ordinary skill in the art.

Figure 1:
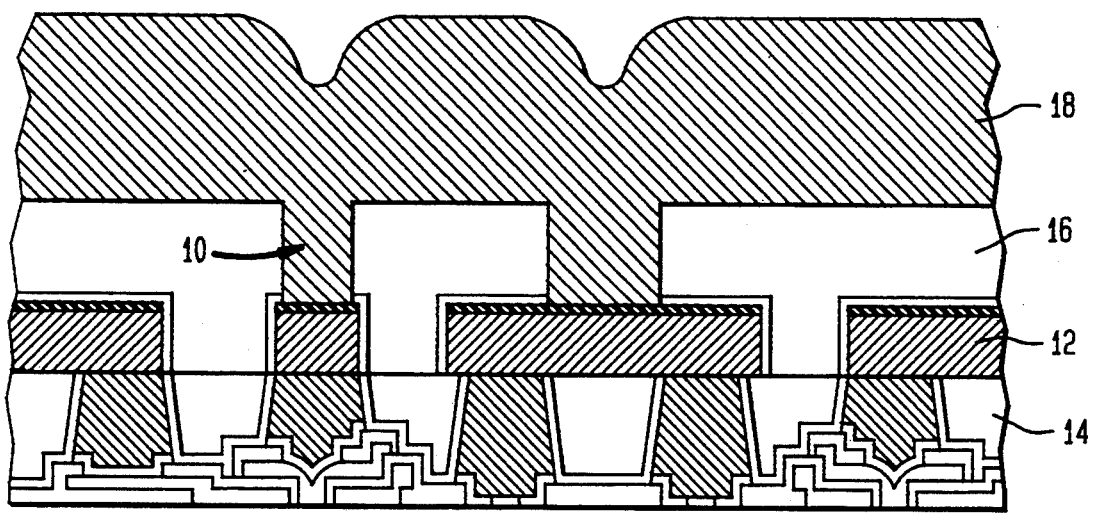
FIGS. 1 and 2 are schematic representations of a VLSI wiring fabrication, including a blanket metal layer upon a dielectric layer.
Figure 2:
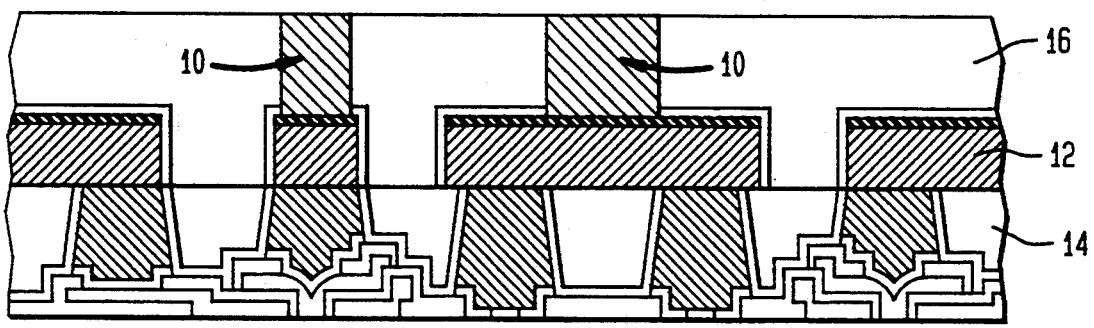
Figure 3:
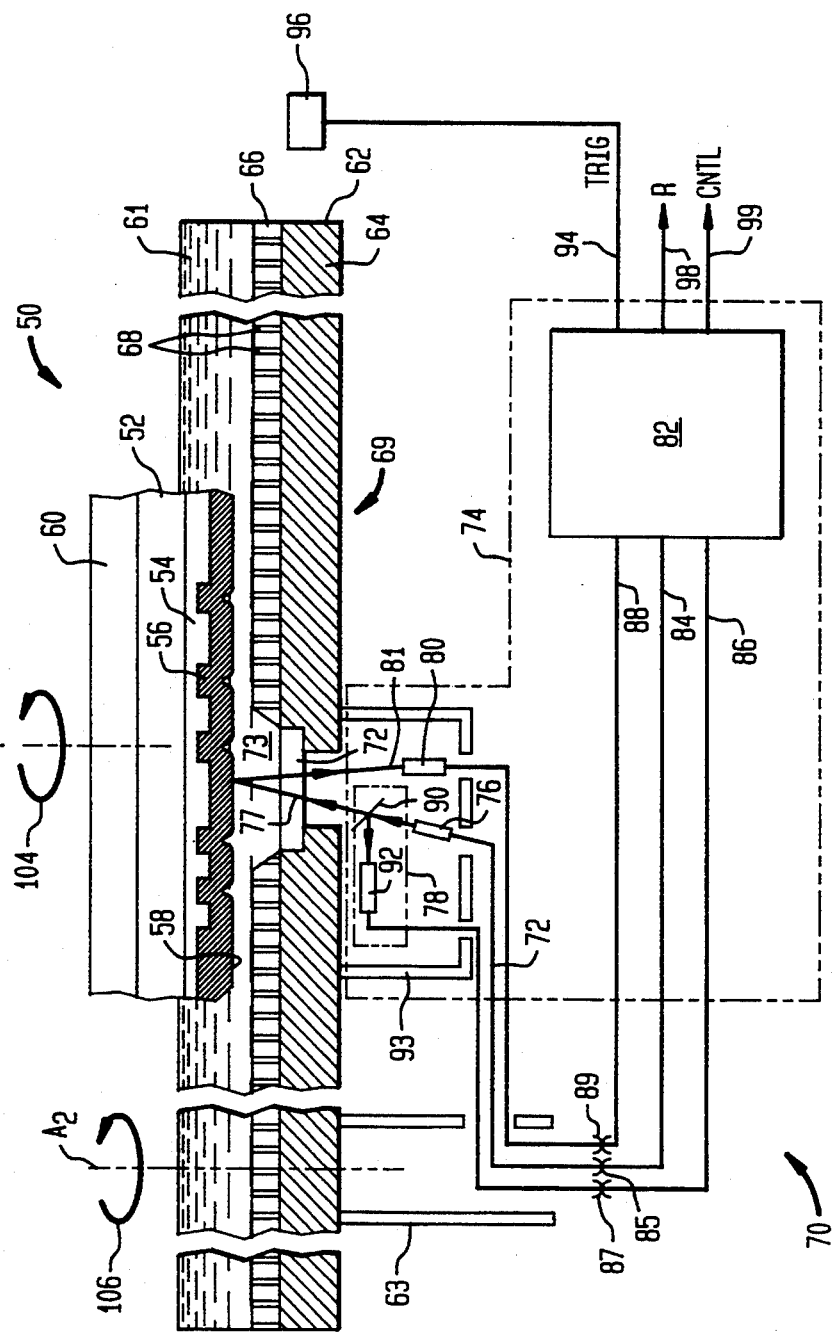
FIG. 3 is a schematic view, with parts in section, of an in-situ real-time polishing process monitor apparatus in accordance with the teachings of the present invention.

Referring now to FIG. 3, an apparatus 50 for chem-mech polishing of a semiconductor wafer or workpiece 52 having a patterned dielectric layer 54 for the subsequent formation of metal lines, contact/via studs, and/or pads is shown. A conformal metal layer 56, comprising for example aluminum, overlies the patterned dielectric layer 54 of semiconductor wafer 52. It should be noted that semiconductor wafer 52 may have been preprocessed and can therefore include layers of interleaved circuitry. For simplicity, those other features are not represented in FIG. 3.

Apparatus 50 may comprise any commercially available chem-mech polishing apparatus, such as, a Strasbaugh 6CA single wafer polisher available from R. Howard Strasbaugh Inc. of Huntington Beach, Calif. Apparatus 50 includes a wafer carrier or holder 60 having a suitable means for securing wafer 52 thereto. As shown, wafer 52 is positioned between wafer carrier 60 and a polishing table 62. Wafer carrier 60 is mounted by suitable means above polishing table 62 for rotation about axis $A_1$ in a direction indicated by arrow 104. Wafer carrier 60 is further positionable between a polishing position and an non-polishing position by a suitable control means (not shown), according to a start/stop signal, as appropriate. In the polishing position, wafer carrier 60 is positioned so that polishing surface 58 is in polishing contact with polishing pad 66, and further wherein carrier 60 exerts a appropriate pressure P upon pad 66. In the non-polishing position, wafer carrier 60 is positioned so that polishing surface 58 is removed from the polishing pad 66, thereby effectively terminating the polishing of surface 58.

The polishing table 62 includes a platen 64 and a polishing pad 66 which may or may not have perforations 68 formed therein. Polishing pad 66 may comprise any suitable commercially available polishing pad, such as from Rodel Inc. of Newark, Del., having a thickness on the order of 50 mils (1 mil=0.001 inch), as will be further discussed herein below. Polishing table 62 rotates via table spindle 63, and a corresponding electrically controllable motor (not shown), about axis $A_2$ in a direction indicated by arrow 106. A polishing slurry 61 is provided also, by a suitable supply means (not shown).

Referring to FIG. 3, according to the present invention, an in-situ real-time polishing process monitor apparatus 70 for monitoring a polishing process during polishing of a workpiece 52 in a polishing machine 50 is shown. Apparatus 70 comprises a viewing window 72, embedded within polishing table 62 at a prescribed location. Viewing window 72 traverses a viewing path during a polishing operation, i.e., during the rotation of polishing table 62, and further enables in-situ viewing of a polishing surface 58 of wafer 52 during polishing thereof. Window 72 allows viewing of the polishing surface 58 from an underside 69 of the polishing table 62, upon the window 72 traversing beneath wafer 52 during a polishing operation. More particularly, window 72 enables in-situ viewing of polishing surface 58 during the traversing of window 72 through a detection region along the viewing path, to be further discussed herein below. While only one window 72 is shown, more than one may be included.

Referring again to FIG. 3, the in-situ real-time polishing process monitor apparatus 70 of the present invention further comprises a reflectance measurement means 74. Reflectance measurement means 74 is coupled to the underside of polishing table 62, and more particularly, optically coupled to window 72 for measuring a reflectance of the polished surface 58 of wafer 52 during the traversing of window 72 through the detection region, discussed further herein below. Reflectance measurement means 74 further provides a reflectance signal, R, representative of an in-situ reflectance, wherein a prescribed change in the in-situ reflectance corresponds to a prescribed condition of the polishing process, such as a polishing endpoint, for example.

In further discussion thereof, viewing window 72 is embedded within the table 62, and more particularly, such that a top surface of the window 72 is substantially flush with a top surface of the platen 64 of table 62. Window 72 may likewise be slightly embedded beneath the top surface of table 62. An appropriate seal, such as an O-ring gasket, may be provided to prevent leakage of slurry around the window and underneath thereof to avoid contamination of components as will hereinafter be discussed. Window 72 comprises a suitable transparent material, such as, quartz, fused silica, sapphire (aluminum oxide), or diamond, further comprising an optional anti-reflection (AR) coating on the bottom and/or top surfaces thereof. Window 72 has a circumferential dimension on the order of five to ten (5-10) mm and is of sufficient hardness and thickness to withstand any adverse mechanical effects during polishing. Possible window configurations include: (1) a fused silica window with an AR-coating of magnesium fluoride ($MgF_2$) on the bottom side thereof, or (2) a diamond window with a diamond-like carbon (DLC) coating on the top side (serving as an abrasion-resistant AR coating for the window/slurry interface) and a silicon dioxide ($SiO_2$) AR coating on the bottom side (window/air interface).

A viewing aperture 73 is provided in polishing pad 66 at a location corresponding to the location of window 72. The aperture is characterized by tapered sidewalls, as shown in FIG. 3, wherein the upper surface of the aperture comprises a larger diameter than the lower surface of the aperture proximate the pad/window interface. Formation of the aperture 73 in the polishing pad 66 may be accomplished by suitable method, such as, accurately cutting the pad with a sharp knife or other suitable instrument, or during the fabrication of the pad 66. The lower surface of the aperture comprises a circumferential dimension on an order of greater or similar magnitude as the corresponding window dimension. Such tapered sidewalls minimize the probability for debris build up around the perimeter of window 72, wherein the debris resulting from film layer material removal during polishing of surface 58 of wafer 52.

In a preferred embodiment, reflectance measurement means 74 comprises a light source 76 for providing an incident light beam 77 at a prescribed incident angle to the underside of window 72 along an incident light beam path for transmission of the incident light beam 77 through window 72. An incident light beam detector 78 detects an amount of incident light provided by light source 76 and provides a first light signal representative of an amount of incident light produced by light source 76. A reflected light beam detector 80 detects an amount of reflected light 81 reflected back through window 72, such as when subsequently reflected off of surface 58 of wafer 52 upon window 72 being within the detection region. Light beam detector 80 further provides a second light signal representative of an amount of reflected light reflected back through window 72.

While a non-normal incident angle has been shown, it is to be noted that a normal incident angle may be utilized with appropriate beam splitters (not shown) for directing the incident and reflected light beams as necessary.

A control means 82 provides an energization signal via signal line 84 to light source means 76 for providing the incident light beam 77 as desired. Control means 82 comprises, for example, a programmable computer or controller and appropriate interface circuitry, well known in the art, for providing the desired functions as described herein above and further below. Electrical connection between control means 82 and light source means 76 is provided, for instance, via an appropriate power cable and connections, including for example, a suitable slip-ring arrangement 85, for enabling the electrical connection to be routed through the rotation shaft spindle 63 of table 62.

Control means 82 is further responsive to the first and second light signals, provided by incident light detecting means 78 and reflected light detecting means 80, respectively, for providing a reflectance measurement therefrom. That is, control means 82 includes appropriate analog-to-digital converter circuitry for converting first and second light signals into digital signals. Control means 82 is further suitably programmed for utilizing the digital signals to effect a division of the intensity of reflected light (I) by the intensity of incident light ($I_o$), thereby obtaining a reflectance measurement amount R (i.e., $R = I/I_o$). First and second light signals are provided to control means 82 through signal lines 86 and 88, respectively. Signal lines 86 and 88 comprise, for instance, appropriate signal cables and connections, including for example, a suitable slip-ring arrangement, 87 and 89, respectively, for enabling the electrical connections to be routed through the rotation shaft spindle 63 of table 62.

Light source 76 can comprise a suitable light source, such as a white light or polychromatic light source, a suitable laser, a HeNe laser, a suitably collimated diode laser, or the like. The light source 76 provides a well-collimated incident light beam 77 along a corresponding incident light beam path. Typically, the beam diameter at the wafer surface comprises a beam on the order of 1 mm, but larger or smaller beams could be used depending on the spatial resolution desired. By using a large size beam, fluctuations due to pattern factor changes across a chip are reduced. The particular beam size is obtained by known methods in the art. For strongly colored slurries, the light source wavelength should be selected to minimize slurry absorption. For instance, a round trip through a 1 mm thick layer of a silica based slurry is found to attenuate a 633 nm HeNe laser beam by about 40%. The actual slurry thickness during polishing, between the wafer being polished and the window 72, is considerably smaller than 1 mm.

Incident light beam detector 78 can comprise a beam splitter 90 and a photodetector 92. Beam splitter 90 is positioned and arranged in the path of the incident light beam 77 for partially reflecting and partially transmitting the incident light beam. More particularly, beam splitter 90 comprises a suitable beam splitter for reflecting a small portion, e.g., on the order of 10%, of the incident light beam to the photodiode 92 and transmitting a bulk portion, e.g., on the order of 90%, of the incident light beam therethrough along the incident light path to the underside of window 72. The partially reflected portion of light directed onto a photodetector 92 is converted into a first signal, wherein the first signal is proportional of an amount of incident light. Photodetector 92 may comprise any suitable detector for detecting the light provided by light source 76, such as, a photodiode, for example.

As shown in FIG. 3, light source 76, incident light beam detector 78, and reflected light beam detector 80 are physically located on the underside of polishing table 62 within a suitable protective cover 93. Protective cover 93 prevents undesirable contamination of the light source and photodetectors. The inside surface of the protective cover 93 can be coated with a non-reflective coating, such as, with a flat black paint, to reduce light scattering effects within the same.

A trigger input $94_{TRIG}$ of control means 82 is electrically connected to a position detection device 96. Position detection device 96 can comprise any suitable means for providing a signal indicative of a pre-established positional relationship between the wafer carrier 60, and thus the wafer 52 being polished, and the window 72, to be discussed further hereafter below with reference to a detection region. A trigger signal received by trigger input $94_{TRIG}$ instructs control means 82 to perform a desired operation responsive to the first and second light signals on signal lines 86 and 88, respectively, for producing a reflectance signal R. The reflectance signal so generated is output on signal line 98. The trigger input $94_{TRIG}$ described above is illustrative and not meant to preclude the use of other triggering means. For instance, control means 82 can be self-triggering whereby overlap of the wafer with the window is detected by a sudden change to a reflectance higher than that of the bare window.

Figure 5:
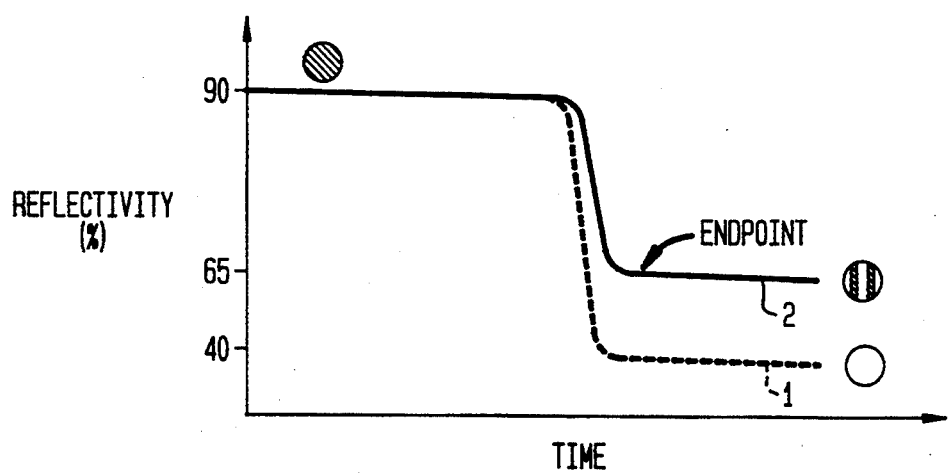
FIG. 5 shows a graph of a reflectivity signal versus time in accordance with the present invention.

Control means 82 receives incident and reflected light signals as discussed above and converts the same into a cognizable form, such as a real-time graph similar to the graph as shown in FIG. 5, for use by an operator of the CMP apparatus or for automatic control purposes as further discussed hereinbelow. For example, control means 82 may include a display means for real-time display of polishing process data of a desired polishing process condition, such as, a polishing endpoint, during the polishing of wafer 52 by CMP apparatus 50. Preferably, the endpoint data is determined from a prescribed change in reflectance during polishing from an initial reflectance, corresponding to a reflectance at the beginning of the polishing operation for a particular wafer. The prescribed change in reflectance corresponds to a given change in reflectance according to the type of material being polished and the corresponding underlying patterned material.

Figure 4:
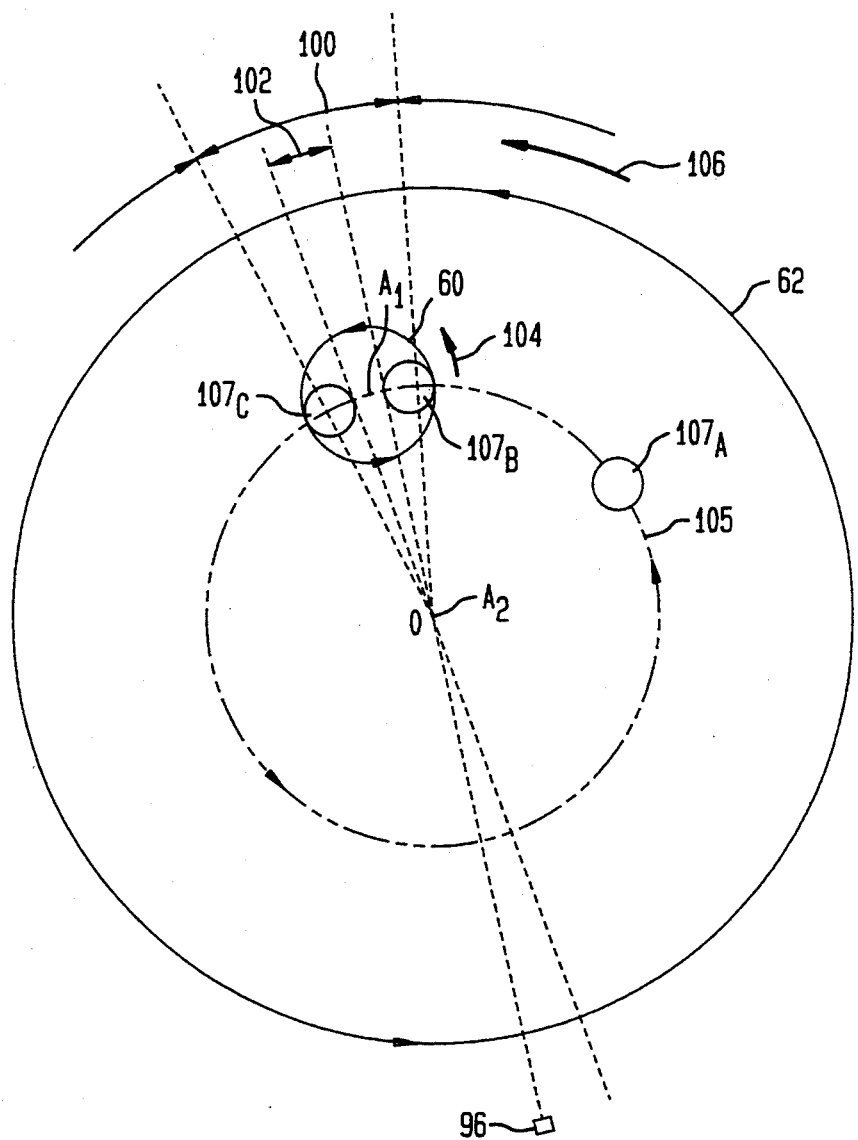
FIG. 4 is a schematic top view representation of the detection region for taking in-situ reflectance measurements during each revolution of the polishing table.

Turning now to FIG. 4, a schematic top view representation of the above-mentioned detection region 100 is shown. Detection region 100 is that region defined by the positional relationship between the wafer holder or carrier 60 of FIG. 3 and window 72 of FIG. 3 in which window 72 is positioned below wafer carrier 60 during polishing as illustrated by numerals $107_B$ and $107_C$. Position detection device 96 is used to detect and indicate when window 72 is within the detection region 100 as window 72 traverses along a prescribed viewing path 105 during rotation of table 62, that is, from $107_B$ to $107_C$. Additionally, position detection device 96 can detect a desired portion 102, for example, of detection region 100. Position detection device 96 preferably comprises any suitable sensing device for sensing desired position information. For instance, position information may include information which is coded on an outer edge portion of polishing table 62. In other words, the position information encoded on the table 62 enables position detection device 96 to output a trigger signal when window 72 is within detection region 100 or at some desired position or positions within detection region 100, such as portion 102. Position encoders are well known in the art and thus not further described herein. Alternatively, position detection device 96 may comprise a position sensing switch and a time delay, such that upon detection of window 72 attaining a prescribed position along its prescribed viewing path 105, i.e., its path of travel, an output signal is generated for a desired time. In this later instance, the desired time would correspond to an amount of travel of window 72 along its viewing path or path of travel as a function of the rotational speed of table 62.

Operation of the in-situ real-time polishing process monitor apparatus 70 of FIG. 3 of the present invention will be discussed using the following example.

Wafer 52, comprising a 5" silicon wafer having a patterned dielectric layer 54 for the formation of metal lines, contact/via studs, and/or pads with features sizes on the order of 1 μm and further having a conformal 5000 Å thick aluminum layer thereon, is mounted onto wafer holder 60 and then placed above polishing table 62. Polishing slurry 61, comprising a suitable slurry, is then added.

Wafer holder 60 and polishing table 62 are then rotated in directions indicated by arrows 104 and 106, respectively. Wafer holder 60 is then positioned in the polishing position, whereby polishing surface 58 is brought into polishing contact with pad 66. Typical holder 60 and table 62 speeds are on the order of 50 revolutions per minute (rpm).

Upon rotation of table 62, window 72 traverses along circular path 105 as shown in FIG. 4. Three positions of window 72 as window 72 traverses along path 105 are indicated by numerals $107_A$, $107_B$, and $107_C$ as also shown in FIG. 4. Window 72 enters and exits detection region 100 as shown by positions $107_B$ and $107_C$, respectively. While within the detection region, in-situ viewing of polishing surface 58 is enabled and in-situ measurements of reflectance of the polishing surface 58 can be obtained by control means 82. The in-situ reflectance measurements are in the form of a pulse whose pulse width depends upon the time spent by the rotating wafer 52 over the window 72, i.e., the detection region 100 can be viewed in terms of time. For the 5" wafer located at a 6.5" radius from axis $A_2$ and a table rotating speed of 60 rpm, this time corresponds to approximately 100 milliseconds (msec). This time will be longer for larger wafer sizes and reduced table speeds. The pulse amplitude at any point in time corresponds to the reflectance, that is, the reflected intensity off the wafer area being illuminated at that time divided by the input intensity at that time. This in-situ reflectance measurement pulse is generated in real-time by control means 82, in response to real-time acquisition of incident and reflected light signals on signal lines 86 and 88, respectively. Control means 82 provides the in-situ reflectance measurement R on output signal line 98 during receipt of a trigger signal on trigger input $94_{TRIG}$. As previously discussed, position detection device 96 provides a trigger signal when wafer 52 is within the detection region 100. Position detection device 96 can be controlled for providing a trigger signal for the entire detection region 100 or a portion 102 of detection region 100.

The trigger location and time window 102 may be selected so as to allow reflectance measurements of a desired duration to be obtained during each table revolution as window 72 enters and exits the detection region 100. The reflectance measurement signal is further analyzed by control means 82 for monitoring and processing, whereby the reflectance data, corresponding to the presence or absence of the undesired bulk portion of layer 56, is collected as the wafer 52 is being polished. Control means 28 further provides a polishing process control signal CNTL, as appropriate, on signal line 99, as shown in FIG. 3. Upon attaining the removal of the last monolayers of bulk portion of layer 56, the CMP apparatus is turned off, manually or via a control output signal CNTL as provided by control means 28, and polishing is stopped. That is, wafer carrier 60 is positioned in the non-polishing position so that polishing surface 58 is removed from polishing contact with polishing pad 66.

FIG. 5 is representative of a cumulative reflectance signal output versus time corresponding to a polishing endpoint. Such a graph can be produced by control means 82 by suitable well known programming of control means 82, using commercially available software, for example, QBASIC, as sold by Microsoft Corporation of Redmond, Wash. FIG. 5 shows a simulation of the reflectance as a function of time for two wafer positions. In the first position (dashed trace), the Al is deposited over bare, unpatterned silicon. In the second position (solid trace), the Al film is deposited over an array of silicon trenches of equal linewidth and spacing. The initial reflectivity at both positions will be around 90%, corresponding to a blanket Al surface. The reflectivity at the polishing endpoint will be close to 35% for position 1 (the reflectivity for bare silicon) and near 65% for position 2 (approximately the area-weighted average of the Al and Si reflectivities). The presence of the slurry and/or an additional dielectric layer in the wafer will slightly alter these values, which were computed for a wafer/air interface. The plot of data points in the FIG. 5 can comprise data points averaged over 3 revolutions (i.e., running average), thereby improving a signal-to-noise ratio. Any noise component of the data can reasonably be smoothed out considerably by this averaging procedure as performed by control means 82.

Simulated output signals of reflectance versus time are shown in FIGS. 6 and 7, as monitored using a digital oscilloscope, for example. FIG. 6 is representative of uniform removal of a metal layer 56. FIG. 7 is representative of a non-uniform removal of a metal layer 56, that is, corresponding to an instance in which the metal layer 56 is cleared away from the edge portions of the wafer before being cleared away from the center portion of the wafer. The parameters used for the determination of a polishing process condition, such as polishing end point and/or polishing non-uniformity condition, by apparatus 70 can be calibrated for every level to be polished, or pre-set values corresponding to the type of material being polished and the pattern factor of the underlying layer, may be used. Once this calibration is performed, a prescribed change in the reflectance will correspond to the polishing endpoint or polishing non-uniformity condition for the given VLSI structure.

Referring again to FIGS. 6 and 7, the in-situ removal monitoring aspect of the present invention will be further explained. A typical reflectance output signal is schematically represented which includes pulses 120 and 122, respectively. Reflectance pulses 120 and 122 are reflectance signal pulses obtained or produced by control means 82 for multiple passes of the window 72 under wafer 52. The reflectance pulses 120 and 122, respectively, are separated in time by a time distance T between the pulses corresponding to the rotation period of the polishing table 62. Each pulse can be analyzed in terms of five (5) different regions: region A is a pre-measurement signal region, region B is a rising signal region, region C is a steady state signal region, region D is a fall off region, and lastly, region E is a post measurement signal region.

The magnitude of the pre- and post-measurement signals contained in regions A and E, respectively, are independent of time and therefore do not contain information about the film layer of the wafer being polished. Upon movement of window 72 along path 105 and completely under wafer carrier 60, only a very thin layer of slurry is present between the wafer and the window. Regions B and D, as shown in FIGS. 6 and 7, correspond to the window being in region $107_B$ and $107_C$ of FIG. 4, respectively. Region C corresponds to the window 72 being under the center region of wafer 52 along path 105.

A lead, center, and trailing edge reflectance measurements may be analyzed in a prescribed manner by control means 82 for real-time monitoring of the polishing of the lead, center, and trailing edge portions of the polished surface 58. An indication of polishing uniformity can easily be detected therefrom, for instance, from variations observed in successive measurements of the wafer's lead edge and center reflectances. Other reflectance measurement comparisons can be made also.

With respect to regions B, C, and D of FIG. 7, different portions thereof correspond to reflectance data from different locations across wafer 52. That is, the magnitude of the reflectance signal is indicative of the presence or absence of the undesired bulk portion of layer 56 across wafer 52. Thus, by inspecting pulse 120 or any subsequent pulses, information about the removal uniformity can be obtained in-situ. In particular, the reflectance amplitude across the pulse in regions B, C, and D can be analyzed by control means 82 for detection of any significant rate of change in the signal beyond a prescribed amount for any one particular pulse. That is, if the rate of change in magnitude exceeds a prescribed amount, corresponding to non-uniformity of removal of material from the polishing material, control means 82 can thereafter provide an indication of such removal non-uniformity, such as, via control signal CNTL on signal line 99, and the polishing process can be modified appropriately. Polishing tool parameters can be modified, manually or automatically, so as to compensate for the detected non-uniformity. As shown in FIG. 7, the signal output is representative of non-uniform polishing conditions wherein the undesired metal was polished away from regions on the wafer corresponding to B and D, while remaining on the wafer in a region corresponding to C. This is an example of the case where the removal rate at the wafer edges is greater than the removal rate at the center of the wafer. Criteria, suitable for a particular polishing operation, can be established as appropriate for an acceptable in-situ non-uniformity set point, i.e., the point at which polishing conditions are modified or terminated due to excessive non-uniform polishing.

In an alternate embodiment, as shown in FIG. 8, an in-situ polishing process monitor 170 is substantially similar to the preferred embodiment, with the following differences. A light guide 172, comprising an optical fiber and associated optical coupling means, is provided for directing incident light 77 from light source 76. Operation of apparatus 170 is substantially similar to that of the preferred embodiment.

There is thus provided a CMP in-situ endpoint detection method and apparatus which provides fast response, real-time operation. In-situ CMP removal uniformity monitoring and detection is provided also. Furthermore, the CMP endpoint/non-uniformity monitoring and detection apparatus of the present invention is suitable for use over a wide range of polishing table speeds.

While the invention has been particularly shown and described with reference to the preferred embodiment thereof, it will be understood by those skilled in the art that various changes in form and detail may be made without departing from the spirit and scope of the invention. For example, in instances where the light source provides a calibrated light of steady intensity, an incident light detector may simply be replaced by a signal representative of the amount of incident light output by the light source.

What is claimed is:

1. An in-situ chemical-mechanical polishing process monitor apparatus for monitoring a polishing process during polishing of a workpiece in a polishing machine, the polishing machine having a rotatable polishing table provided with a polishing slurry, said apparatus comprising:
   a) a window embedded within the polishing table, said window traversing a viewing path during polishing and further enabling in-situ viewing of a polishing surface of the workpiece from an underside of the polishing table during polishing as said window traverses a detection region along the viewing path; and
   b) means coupled to said window on the underside of the polishing table for measuring a reflectance, said reflectance measurement means providing a reflectance signal representative of an in-situ reflectance, wherein a prescribed change in the in-situ reflectance corresponds to a prescribed condition of the polishing process.

2. The apparatus of claim 1, wherein:
said window further being embedded within the table wherein a top surface of said window is substantially flush with a top surface of the table.

3. The apparatus of claim 1, wherein:
said reflectance measurement means comprises i) a light source for providing an incident light beam incident upon an underside of said window and transmitted therethrough at a prescribed incident angle, ii) a first detector for detecting an amount of incident light provided by said light source, said first detector providing a first signal representative of the amount of incident light, iii) a second detector for detecting an amount of a reflected light reflected back through said window, said second detector providing a second signal representative of the amount of reflected light, and iv) means responsive to said first and second signals, respectively, for providing the reflectance signal, the reflectance signal corresponding to a ratio of the reflected light to the incident light.

4. The apparatus of claim 3, further wherein:
i) said light source comprises a laser, the laser providing a well-collimated incident light beam incident upon the underside of said window along an incident light beam path,
ii) said first detector comprises a beam splitter and a photodiode, wherein the beam splitter is arranged in the path of the incident light beam for reflecting a portion of the light beam to the photodiode and transmitting a remainder portion of the incident light beam therethrough along the incident light beam path to the underside of said window, and
iii) said second detector comprises a photodiode.

5. The apparatus of claim 4, still further wherein:
the laser is positioned distant from the rotating table, said light source further comprises an optical means for guiding and directing the incident light beam to be incident upon the underside of said window along the incident light beam path.

6. The apparatus of claim 1, further comprising:
c) means responsive to reflectance signal for detecting the prescribed change in the in-situ reflectance in real-time, said detection means providing an output signal indicative of the detection of the prescribed change in the in-situ reflectance.

7. The apparatus of claim 6, wherein:
said window further being embedded within the table wherein a top surface of said window is substantially flush with a top surface of the table.

8. The apparatus of claim 6, wherein:
said reflectance measurement means comprises i) a light source for providing an incident light beam incident upon an underside of said window and transmitted therethrough at a prescribed incident angle, ii) a first detector for detecting an amount of incident light provided by said light source, said first detector providing a first signal representative of the amount of incident light, iii) a second detector for detecting an amount of a reflected light reflected back through said window, said second detector providing a second signal representative of the amount of reflected light, and iv) means responsive to said first and second signals, respectively, for providing the reflectance signal, the reflectance signal corresponding to a ratio of the reflected light to the incident light.

9. The apparatus of claim 8, further wherein:
i) said light source comprises a laser, the laser providing a well-collimated incident light beam incident upon the underside of said window along an incident light beam path,
ii) said first detector comprises a beam splitter and a photodiode, wherein the beam splitter is arranged in the path of the incident light beam for reflecting a portion of the light beam to the photodiode and transmitting a remainder portion of the incident light beam therethrough along the incident light beam path to the underside of said window, and
iii) said second detector comprises a photodiode.

10. The apparatus of claim 9, still further wherein:
the laser is positioned distant from the rotating table, said light source further comprises an optical means for guiding and directing the incident light beam to be incident upon the underside of said window along the incident light beam path.

11. The apparatus of claim 6, further wherein:
said detection means further comprises means responsive the output signal for controlling the polishing process.

12. The apparatus of claim 11, wherein:

said window further being embedded within the table wherein a top surface of said window is substantially flush with a top surface of the table.

13. The apparatus of claim 11, wherein:

said reflectance measurement means comprises i) a light source for providing an incident light beam incident upon an underside of said window and transmitted therethrough at a prescribed incident angle, ii) a first detector for detecting an amount of incident light provided by said light source, said first detector providing a first signal representative of the amount of incident light, iii) a second detector for detecting an amount of a reflected light reflected back through said window, said second detector providing a second signal representative of the amount of reflected light, and iv) means responsive to said first and second signals, respectively, for providing the reflectance signal, the reflectance signal corresponding to a ratio of the reflected light to the incident light.

14. The apparatus of claim 13, further wherein:

i) said light source comprises a laser, the laser providing a well-collimated incident light beam incident upon the underside of said window along an incident light beam path, ii) said first detector comprises a beam splitter and a photodiode, wherein the beam splitter is arranged in the path of the incident light beam for reflecting a portion of the light beam to the photodiode and transmitting a remainder portion of the incident light beam therethrough along the incident light beam path to the underside of said window, and iii) said second detector comprises a photodiode.

15. The apparatus of claim 14, still further wherein:

the laser is positioned distant from the rotating table, said light source further comprises an optical means for guiding and directing the incident light beam to be incident upon the underside of said window along the incident light beam path.

16. The apparatus of claim 11, still further wherein:

said detection means detects a polishing endpoint corresponding to the prescribed change in the in-situ reflectance, and further wherein said detection means controls the polishing process for terminating the polishing of the workpiece in response to the detection of the polishing endpoint.

17. The apparatus of claim 11, still further wherein:

said detection means detects a polishing non-uniformity corresponding to the prescribed change in the in-situ reflectance, and further wherein said detection means controls the polishing process for terminating the polishing of the workpiece in response to the detection of the polishing non-uniformity.

18. An in-situ chemical-mechanical polishing process monitor method for monitoring a polishing process during polishing of a workpiece in a polishing machine, the polishing machine having a rotatable polishing table provided with a polishing slurry, said method comprising the steps of:

a) providing a window embedded within the polishing table, the window traversing a viewing path during polishing and further enabling in-situ viewing of a polishing surface of the workpiece from an underside of the polishing table during polishing as the window traverses a detection region along the viewing path; and b) providing a means coupled to the window on the underside of the polishing table for measuring a reflectance, the reflectance measurement means providing a reflectance signal representative of an in-situ reflectance, wherein a prescribed change in the in-situ reflectance corresponds to a prescribed condition of the polishing process.

19. The method of claim 18, wherein:

providing the window further comprises being embedded within the table wherein a top surface of the window is substantially flush with a top surface of the table.

20. The method of claim 18, wherein:

providing the reflectance measurement means comprises providing: i) a light source for providing an incident light beam incident upon an underside of the window and transmitted therethrough at a prescribed incident angle, ii) a first detector for detecting an amount of incident light provided by the light source, the first detector providing a first signal representative of the amount of incident light, iii) a second detector for detecting an amount of a reflected light reflected back through the window, the second detector providing a second signal representative of the amount of reflected light, and iv) means responsive to the first and second signals, respectively, for providing the reflectance signal, the reflectance signal corresponding to a ratio of the reflected light to the incident light.

21. The method of claim 20, further wherein:

i) the light source comprises a laser, the laser providing a well-collimated incident light beam incident upon the underside of the window along an incident light beam path, ii) the first detector comprises a beam splitter and a photodiode, wherein the beam splitter is arranged in the path of the incident light beam for reflecting a portion of the light beam to the photodiode and transmitting a remainder portion of the incident light beam therethrough along the incident light beam path to the underside of the window, and iii) the second detector comprises a photodiode.

22. The method of claim 21, still further wherein:

the laser is positioned distant from the rotating table and the light source further comprises an optical means for guiding and directing the incident light beam to be incident upon the underside of the window along the incident light beam path.

23. The method of claim 18, further comprising:

c) providing a means responsive to reflectance signal for detecting the prescribed change in the in-situ reflectance in real-time, the detection means providing an output signal indicative of the detection of the prescribed change in the in-situ reflectance.

24. The method of claim 23, wherein:

providing the window further comprises being embedded within the table wherein a top surface of said window is substantially flush with a top surface of the table.

25. The method of claim 23, wherein:

providing the reflectance measurement means comprises providing: i) a light source for providing an incident light beam incident upon an underside of the window and transmitted therethrough at a prescribed incident angle, ii) a first detector for detecting an amount of incident light provided by the light source, the first detector providing a first signal representative of the amount of incident light, iii) a second detector for detecting an amount of a reflected light reflected back through the window, the second detector providing a second signal representative of the amount of reflected light, and
iv) means responsive to the first and second signals, respectively, for providing the reflectance signal, the reflectance signal corresponding to a ratio of the reflected light to the incident light.

26. The method of claim 25, further wherein:
i) the light source comprises a laser, the laser providing a well-collimated incident light beam incident upon the underside of the window along an incident light beam path,
ii) the first detector comprises a beam splitter and a photodiode, wherein the beam splitter is arranged in the path of the incident light beam for reflecting a portion of the light beam to the photodiode and transmitting a remainder portion of the incident light beam therethrough along the incident light beam path to the underside of the window, and
iii) the second detector comprises a photodiode.

27. The method of claim 26, still further wherein:
the laser is positioned distant from the rotating table, the light source further comprises an optical means for guiding and directing the incident light beam to be incident upon the underside of the window along the incident light beam path.

28. The method of claim 23, further wherein:
the detection means further comprises means responsive the output signal for controlling the polishing process.

29. The method of claim 28, wherein:
providing the window further comprises being embedded within the table wherein a top surface of the window is substantially flush with a top surface of the table.

30. The method of claim 28, wherein:
providing the reflectance measurement means comprises providing: i) a light source for providing an incident light beam incident upon an underside of the window and transmitted therethrough at a prescribed incident angle, ii) a first detector for detecting an amount of incident light provided by the light source, the first detector providing a first signal representative of the amount of incident light, iii) a second detector for detecting an amount of a reflected light reflected back through the window, the second detector providing a second signal representative of the amount of reflected light, and iv) means responsive to the first and second signals, respectively, for providing the reflectance signal, the reflectance signal corresponding to a ratio of the reflected light to the incident light.

31. The method of claim 30, further wherein:
i) the light source comprises a laser, the laser providing a well-collimated incident light beam incident upon the underside of the window along an incident light beam path,
ii) the first detector comprises a beam splitter and a photodiode, wherein the beam splitter is arranged in the path of the incident light beam for reflecting a portion of the light beam to the photodiode and transmitting a remainder portion of the incident light beam therethrough along the incident light beam path to the underside of the window, and
iii) the second detector comprises a photodiode.

32. The method of claim 31, still further wherein:
the laser is positioned distant from the rotating table, the light source further comprises a optical means for guiding and directing the incident light beam to be incident upon the underside of the window along the incident light beam path.

33. The method of claim 28, still further wherein:
the detection means detects a polishing endpoint corresponding to the prescribed change in the in-situ reflectance, and further wherein the detection means controls the polishing process for terminating the polishing of the workpiece in response to the detection of the polishing endpoint.

34. The method of claim 28, still further wherein:
the detection means detects a polishing non-uniformity corresponding to the prescribed change in the in-situ reflectance, and further wherein the detection means controls the polishing process for terminating the polishing of the workpiece in response to the detection of the polishing non-uniformity.

35. A polishing machine having in-situ polishing process monitor control of a polishing process during polishing of a workpiece on a rotatable polishing table provided with a polishing slurry, said polishing machine comprising:
a) a window embedded within the polishing table, said window traversing a viewing path during polishing and further enabling in-situ viewing of a polishing surface of the workpiece from an underside of the polishing table during polishing as said window traverses a detection region along the viewing path;
b) means coupled to said window on the underside of the polishing table for measuring a reflectance, said reflectance measurement means providing a reflectance signal representative of an in-situ reflectance, wherein a prescribed change in the in-situ reflectance corresponds to a prescribed condition of the polishing process.

36. The polishing machine of claim 35, wherein:
said window further being embedded within the table wherein a top surface of said window is substantially flush with a top surface of the table.

37. The polishing machine of claim 35, wherein:
said reflectance measurement means comprises i) a light source for providing an incident light beam incident upon an underside of said window and transmitted therethrough at a prescribed incident angle, ii) a first detector for detecting an amount of incident light provided by said light source, said first detector providing a first signal representative of the amount of incident light, iii) a second detector for detecting an amount of a reflected light reflected back through said window, said second detector providing a second signal representative of the amount of reflected light, and iv) means responsive to said first and second signals, respectively, for providing the reflectance signal, the reflectance signal corresponding to a ratio of the reflected light to the incident light.

38. The apparatus of claim 37, further wherein:
i) said light source comprises a laser, the laser providing a well-collimated incident light beam incident upon the underside of said window along an incident light beam path,
ii) said first detector comprises a beam splitter and a photodiode, wherein the beam splitter is arranged in the path of the incident light beam for reflecting a portion of the light beam to the photodiode and transmitting a remainder portion of the incident light beam therethrough along the incident light beam path to the underside of said window, and iii) said second detector comprises a photodiode.

39. The apparatus of claim 38, still further wherein:
the laser is positioned distant from the rotating table, said light source further comprises an optical means for guiding and directing the incident light beam to be incident upon the underside of said window along the incident light beam path.

40. The polishing machine of claim 35, further comprising:
c) means responsive to the reflectance signal for detecting the prescribed change in the in-situ reflectance in real-time, said detection means providing an output signal representative of the detection of the prescribed change in the in-situ reflectance.

41. The polishing machine of claim 40, further wherein:
said window further being embedded within the table wherein a top surface of said window is substantially flush with a top surface of the table.

42. The polishing machine of claim 40, further wherein:
said reflectance measurement means comprises i) a light source for providing an incident light beam incident upon an underside of said window and transmitted therethrough at a prescribed incident angle, ii) a first detector for detecting an amount of incident light provided by said light source, said first detector providing a first signal representative of the amount of incident light, iii) a second detector for detecting an amount of a reflected light reflected back through said window, said second detector providing a second signal representative of the amount of reflected light, and iv) means responsive to said first and second signals, respectively, for providing the reflectance signal, the reflectance signal corresponding to a ratio of the reflected light to the incident light.

43. The apparatus of claim 42, further wherein:
i) said light source comprises a laser, the laser providing a well-collimated incident light beam incident upon the underside of said window along an incident light beam path,
ii) said first detector comprises a beam splitter and a photodiode, wherein the beam splitter is arranged in the path of the incident light beam for reflecting a portion of the light beam to the photodiode and transmitting a remainder portion of the incident light beam therethrough along the incident light beam path to the underside of said window, and
iii) said second detector comprises a photodiode.

44. The apparatus of claim 43, still further wherein:
the laser is positioned distant from the rotating table, said light source further comprises an optical means for guiding and directing the incident light beam to be incident upon the underside of said window along the incident light beam path.

45. The polishing machine of claim 40, further wherein:
said detection means further comprises means responsive to the output signal for controlling the polishing process.

46. The polishing machine of claim 45, still further wherein:
said window further being embedded within the table wherein a top surface of said window is substantially flush with a top surface of the table.

47. The polishing machine of claim 45, still further wherein:
said reflectance measurement means comprises i) a light source for providing an incident light beam incident upon an underside of said window and transmitted therethrough at a prescribed incident angle, ii) a first detector for detecting an amount of incident light provided by said light source, said first detector providing a first signal representative of the amount of incident light, iii) a second detector for detecting an amount of a reflected light reflected back through said window, said second detector providing a second signal representative of the amount of reflected light, and iv) means responsive to said first and second signals, respectively, for providing the reflectance signal, the reflectance signal corresponding to a ratio of the reflected light to the incident light.

48. The apparatus of claim 47, further wherein:
i) said light source comprises a laser, the laser providing a well-collimated incident light beam incident upon the underside of said window along an incident light beam path,
ii) said first detector comprises a beam splitter and a photodiode, wherein the beam splitter is arranged in the path of the incident light beam for reflecting a portion of the light beam to the photodiode and transmitting a remainder portion of the incident light beam therethrough along the incident light beam path to the underside of said window, and
iii) said second detector comprises a photodiode.

49. The apparatus of claim 48, still further wherein:
the laser is positioned distant from the rotating table, said light source further comprises an optical means for guiding and directing the incident light beam to be incident upon the underside of said window along the incident light beam path.

50. The polishing machine of claim 45, still further wherein:
said detection means detects a polishing endpoint corresponding to the prescribed change in the in-situ reflectance, and further wherein said detection means controls the polishing process for terminating the polishing of the workpiece in response to the detection of the polishing endpoint.

51. The polishing machine of claim 45, still further wherein:
said detection means detects a polishing non-uniformity corresponding to the prescribed change in the in-situ reflectance, and further wherein said detection means controls the polishing process for terminating the polishing of the workpiece in response to the detection of the polishing non-uniformity.

* * * * *